United States Patent [19]

Smearing

[11] 4,258,147
[45] Mar. 24, 1981

[54] ANTIFOAMING RESIN COMPOSITIONS

[75] Inventor: Robert W. Smearing, Ballston Lake, N.Y.

[73] Assignee: General Electric Company, Waterford, N.Y.

[21] Appl. No.: 73,049

[22] Filed: Sep. 6, 1979

Related U.S. Application Data

[63] Continuation of Ser. No. 604,368, Aug. 13, 1975, abandoned, which is a continuation of Ser. No. 212,700, Dec. 27, 1971, abandoned.

[51] Int. Cl.³ .............................................. C05L 63/00
[52] U.S. Cl. .................................. 525/122; 525/171; 525/109
[58] Field of Search ............... 525/171, 122; 260/836, 260/837

[56] References Cited

U.S. PATENT DOCUMENTS

| | | | |
|---|---|---|---|
| 3,431,235 | 3/1969 | Lubowitz | 260/77.5 C |
| 3,515,772 | 6/1970 | Lubowitz | 260/836 |
| 3,528,878 | 9/1970 | Lubowitz | 260/836 |
| 3,616,193 | 10/1971 | Lubowitz | 260/836 |
| 3,674,893 | 7/1972 | Nowak | 525/171 |
| 3,793,400 | 2/1974 | Curtis | 525/171 |
| 3,927,234 | 12/1975 | Lindner | 428/273 |
| 3,980,610 | 9/1976 | Conrad | 525/171 |
| 3,989,769 | 11/1976 | Bonnington | 525/171 |

*Primary Examiner*—Paul Lieberman
*Attorney, Agent, or Firm*—John L. Young; Joseph B. Forman

[57] ABSTRACT

The foaming of resinous insulating materials under vacuum is substantially reduced by adding to the material a polydiene having primarily vinyl unsaturation.

6 Claims, No Drawings

ANTIFOAMING RESIN COMPOSITIONS

This is a continuation of application Ser. No. 604,368 filed Aug. 13, 1975, which, in turn, is a continuation of application Ser. No. 212,700, filed Dec. 27, 1971, both now abandoned.

This invention relates to electrical insulating materials. More particularly, it relates to resinous insulating materials which under vacuum exhibit little or no foaming.

It is well known in the art to cure electrical conductors or conductor bars which are made up of a number of electrical conductors with an outer insulation sometimes known as ground insulation which typically comprises a plurality of layers of micaceous insulation often overlaid with an armor tape such as of glass cloth. With the insulating layers in place, the entire bar is treated and impregnated with a resinous material such as epoxy resin which is then cured in place to provide the final ground insulation. According to one method of impregnation, the bar with base insulation in place is placed in a tank which is then evacuated, the resin being introduced under vacuum which is held for a period of time. Atmospheric pressure is then applied and the bar allowed to soak or take up the resin in its insulation. Then the pressure is raised for a period of time to facilitate impregnation and the pressure released to atmospheric. The impregnated bar is then removed, allowed to drain and baked to cure the resin. The cycle of impregnation prior to baking can be repeated as desired to increase the resin content.

While the above method of providing electrical insulation for conductor bars is adequate in many respects, it has been found that in some cases excessive foaming of the resin takes place under vacuum, complicating, and detracting from, the impregnation process. It is a primary object of the present invention to provide resin compositions suitable for vacuum-pressure impregnation which are characterized by substantially reduced foaming.

Briefly, according to the present invention, there is added to the impregnating resin by weight from about 0.05 to 10 percent, and preferably from 0.05 to one percent, based on the weight of the resin composition of a polydiene in which at least 80 percent of the olefinic unsaturation consists of pendant vinyl groups situated mainly on alternate carbon atoms of the backbone carbon chain.

Those features of the invention which are believed to be novel are set forth with particularity in the claims appended hereto. The invention will, however, be better understood and further objects and advantages appreciated from a consideration of the following description.

Any of a number of resins can be used in connection with the present invention including epoxies, polyesters, acrylics and the like. Typical of such materials are epoxy resins containing 1,2 epoxy groups, a phenolic accelerator in quantities between 0.1 and 15 percent by weight of the epoxy resin containing an organic titanate curing agent in quantities between 0.05 and 10 percent by weight of the epoxy resin. The concentration of the phenolic accelerator or organic titanate used with any particular resin can be varied to alter the cure rate of the epoxy resin.

The epoxy resin employed in the thermosetting resin in this invention can be any epoxy resin having 1,2 epoxy groups or mixtures of such resins as indicated, and includes cycloaliphatic epoxy resins, such as 3,4-epoxycyclohexylmethyl-(3,4-epoxy)cyclohexane carboxylate (sold under the trademarks ERL 4221 by Union Carbide Plastics Company, or Araldite CY 179 by Ciba Products Company), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl)ether resins (sold under the trademark ERL 4205 by Union Carbide Plastics Company), 2-(3,4-epoxy)cyclohexyl-5,5-spiro(3,4-epoxy)-cyclohexane-m-dioxane (sold under the trademark Araldite CY 175 by Ciba Products Company), glycidyl ethers of polyphenols epoxy resins, such as liquid or solid bisphenol-A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetra-glycidoxy tetraphenylethane (Epon 1031 made by Shell Chemical Company), glycidyl ester epoxy resins such as diglycidyl phthalate (ED-5661 by Celanese Resins Company), diglycidyl tetrahydrophthalate (Araldite CY 182 by Ciba Products Company) and diglycidyl hexahydrophthalate (Araldite CY 183 made by Ciba Products Company or ED-5662 made by Celanese Resins Company), and flame retardant epoxy resins such as halogen containing bisphenol-A diglycidyl ether epoxy resins (e.g., DER 542 and DER 511 which have bromine contents of 44–48 and 18–20 percent, respectively, and are made by Dow Chemical Company).

The foregoing epoxy resins are well known in the art and are set forth, for example, in many patents including U.S. Pat. Nos. 2,324,483; 2,444,333; 2,494,295; 2,500,600; and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and non-reactive epoxy diluents (or extenders), epoxy flexibilizers and fillers. Thus, while epoxy resin hardeners of the prior art are effective with only a select group of epoxy resins, the epoxy resin hardeners of this invention (to be more fully explained hereinafter) are effective for crosslinking all groups of epoxy resins.

The hardener for the epoxy resin impregnant generally consists of a mixture of an organic titanate and a phenolic accelerator wherein the phenolic accelerator is present in quantities less than 15 percent by weight of the epoxy resin. Among the phenolic accelerators which can be effectively used in this invention are bisphenol-A [i.e., 2,2-bis(4-hydroxyphenyl)propane], pyrogallol, dihydroxydiphenyls as well as ortho-, meta-, and para- hydroxybenzaldehydes (such as salicylaldehyde), catechol, resorcinol, hydroquinone, and phenol-formaldehyde and resorcinolformaldehyde condensates.

Examples of other phenolic accelerators suitably employed for the resin impregnant also include halogenated phenols such as ortho-, meta-, and parachlorophenols or bromo-phenols, and ortho-, meta-, and paranitrophenols. Desirably, the phenolic accelerator is present in concentrations between 0.1 and 15 percent by weight of the epoxy resin with optimum cure rates being produced with phenolic accelerator concentrations between 0.5 and 10 percent by weight of the epoxy resin. In general, the cure rate of the epoxy resin can be altered by varying the weight percentage of phenolic accelerator employed with the epoxy resin or by an alteration in the phenolic accelerator-epoxy resin combination. For example, the cure rate of ERL 4221-titanate-bisphenol-A solutions can be significantly increased by substituting a phenol-formaldehyde novolac accelerator for the bisphenol-A accelerator. Similarly, by substituting the phenol-formaldehyde novolac in the ERL 4221-titanate-novolac solution with catechol, the rate of cure can again be markedly increased. Within each epoxy-titanate-phenolic combination, the cure rate generally can be increased by increasing the relative phenolic content. By substituting the cycloaliphatic epoxy resin ERL 4221 with a diglycidyl ether epoxy resin such as Epon 828, the cure rate is decreased. Although the cure rate can be varied over a very wide range, the cured resins are tough solids with excellent electrical insulating properties.

The organic titanate added to the epoxy resin to assist the phenolic accelerator in controllably hardening the epoxy resin preferably is a chelated titanate such as acetylacetonate titanate, lactate titanate, triethanolamine titanate, polyhydroxystearate titanate, a glycolate titanate (e.g., tetraoctylene glycol titanate containing approximately 7.8 percent Ti and sold under the trademark Tyzor OG by E.I. duPont de Nemours and Company, or di-n-butyl hexylene glycol titanate), or a chelate stabilized with a nitrogen containing polymer (e.g., Tyzor WR sold by E.I. duPont de Nemours & Company). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titanate, and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture in a concentration between 0.05 and 10 percent by weight of the epoxy resin with optimum cure rates generally being obtained utilizing titanate concentrations between 0.2 and 5 percent by weight of the epoxy resin.

The resin, phenolic accelerator and titanate chosen for the thermosetting impregnating resin can be mixed in any conventional fashion. A liquid phenolic can be dissolved in the epoxy resin or in the titanate either at room temperature or at elevated temperatures. A solid phenolic accelerator in powdered form also can be dissolved in the epoxy resin at room temperature by continuous agitation prior to mixing with the chosen titanate or a liquid concentrate can be formed by dissolving the powdered phenol in part of the epoxy resin at temperatures between 150° and 160° C. whereafter the liquid solution is mixed with the remainder of the epoxy resin. Alternately, the solid phenolic accelerator can be dissolved in the titanate at temperatures of 100°-160° C. whereupon the phenolic accelerator/titanate mixture is added to the epoxy resin to effect hardening.

The polydienes useful in connection with the present invention are described in the literature, for example, U.S. Pat. No. 3,431,235 patented Mar. 4, 1969. The polydienes have predominantly pendant vinyl groups on alternate carbon atoms of the backbone carbon chain, typically have a molecular weight ranging from about 500 to about 3,000 and include 1,2 polybutadiene as described, for example, in U.S. Pat. No. 3,528,878 issued Sept. 15, 1970.

The following examples will illustrate the practice of the present invention, it being realized that they are to be taken as exemplary only and not limiting in any way. All parts and percentages are by weight unless otherwise indicated. In each case the foaming tendency of the resin was tested by placing 100 parts by weight of resin in a one-quart jar along with the indicated amount of anti-foamer. The mixture was stirred very rapidly to trap air bubbles and the jar placed under a vacuum. The resultant foam head was allowed to expand until it collapsed and the maximum travel distance of the head was used as an indication of the effectiveness of the anti-foamer.

Shown in Table I below are the results obtained using no anti-foamer, a typical prior art anti-foamer, and the present anti-foamer in connection with the epoxy resin compositions set forth above as well as with unsaturated polyester resin and filled epoxy resin. In the table, resin A is a composition containing 97 parts ERL 4221, two parts Tyzor OG and one part of bisphenol-A. Resin B is an unsaturated polyester comprising as reactive ingredients neopentyl glycol, isophthalic acid, fumaric acid, dicyclopentadiene and vinyl toluene. Resin C is an epoxy resin composition consisting of 100 parts Epon 828, 50 parts of talc and 10 parts triethylene tetramine. Antifoam Q is a silicone antifoaming material manufactured by the Dow Chemical Company. Hystyl B-1000 is a polydiene as described above, specifically polybutadiene, manufactured by the Hystyl Development Company and having a molecular weight of about 1000. Hystyl B-3000 is a similar material having a molecular weight of about 3000.

TABLE I

| Example | Resin | Antifoamer | Quantity % | Head Height, cm |
|---------|-------|------------|------------|-----------------|
| 1 | A | None | — | >20 |
| 2 | A | Antifoam Q | 0.002 | 11 |
| 3 | A | Antifoam Q | 0.05 | 7 |
| 4 | A | Hystyl B-1000 | 0.1 | 6 |
| 5 | A | Hystyl B-1000 | 0.2 | 5 |
| 6 | A | Hystyl B-1000 | 0.5 | 4–4.5 |
| 7 | A | Hystyl B-1000 | 2.0 | 4–4.5 |
| 8 | A | Hystyl B-3000 | 0.05 | 4 |
| 9 | A | Hystyl B-3000 | 0.1 | 4 |
| 10 | B | None | — | 10 |
| 11 | B | Hystyl B-3000 | 0.05 | <1 |
| 12 | C | Hystyl B-3000 | 0.2–0.3 | 5 |

From the above table it will be at once evident that the use of from about 0.05 upward of the present anti-foaming materials results in a composition which is quite resistant to foaming under vacuum. This is particularly true as compared to a typical prior art silicone base antifoaming material and as compared, of course, to such compositions using no antifoamer at all.

There are provided by the present invention resinous compositions which are characterized by low foaming under reduced pressure, making them particularly useful in the vacuum-pressure impregnation of electrical insulation and other materials.

What I claim as new and desire to secure by Letters Patent of the United States is:

1. An epoxy resinous mixture characterized by low foaming including from about 0.05 to 10 percent, based on the resin weight, of polybutadiene in which at least 80 percent of the olefinic unsaturation consists of pendant vinyl groups.

2. A resinous mixture as in claim 1 in which said epoxy resin mixture contains a 1,2-polybutadiene.

3. A resinous mixture as in claim 1 which additionally contains a phenolic accelerator.

4. A resinous mixture as in claim 3 which additionally contains an organic titanate curing agent.

5. A resinous mixture as in claim 1 in which said resin is an epoxy resin having a chelated titanate curing agent and a phenolic accelerator.

6. A resinous mixture as in claim 1 which is suitable for vacuum pressure impregnation.

* * * * *